Feb. 24, 1942. E. WIEDMANN 2,274,226
BROACHING MACHINE
Filed June 10, 1938 2 Sheets—Sheet 1
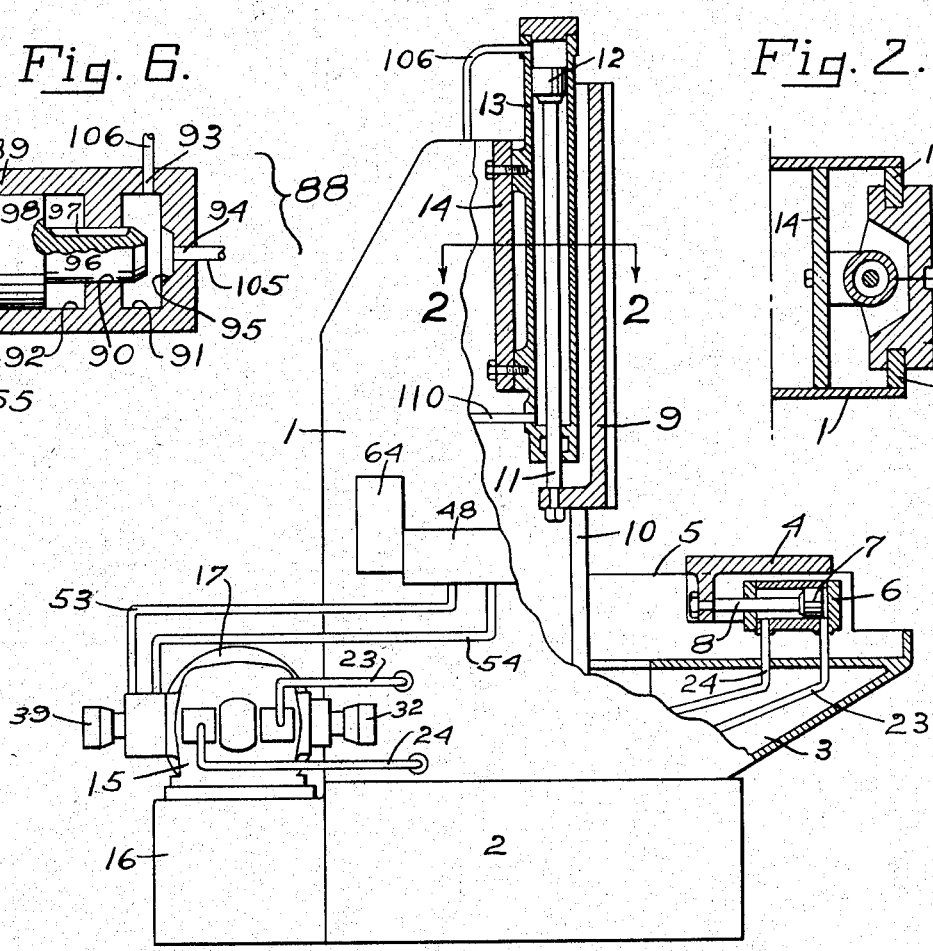
INVENTOR.
ERNST WIEDMANN
BY
ATTORNEY.

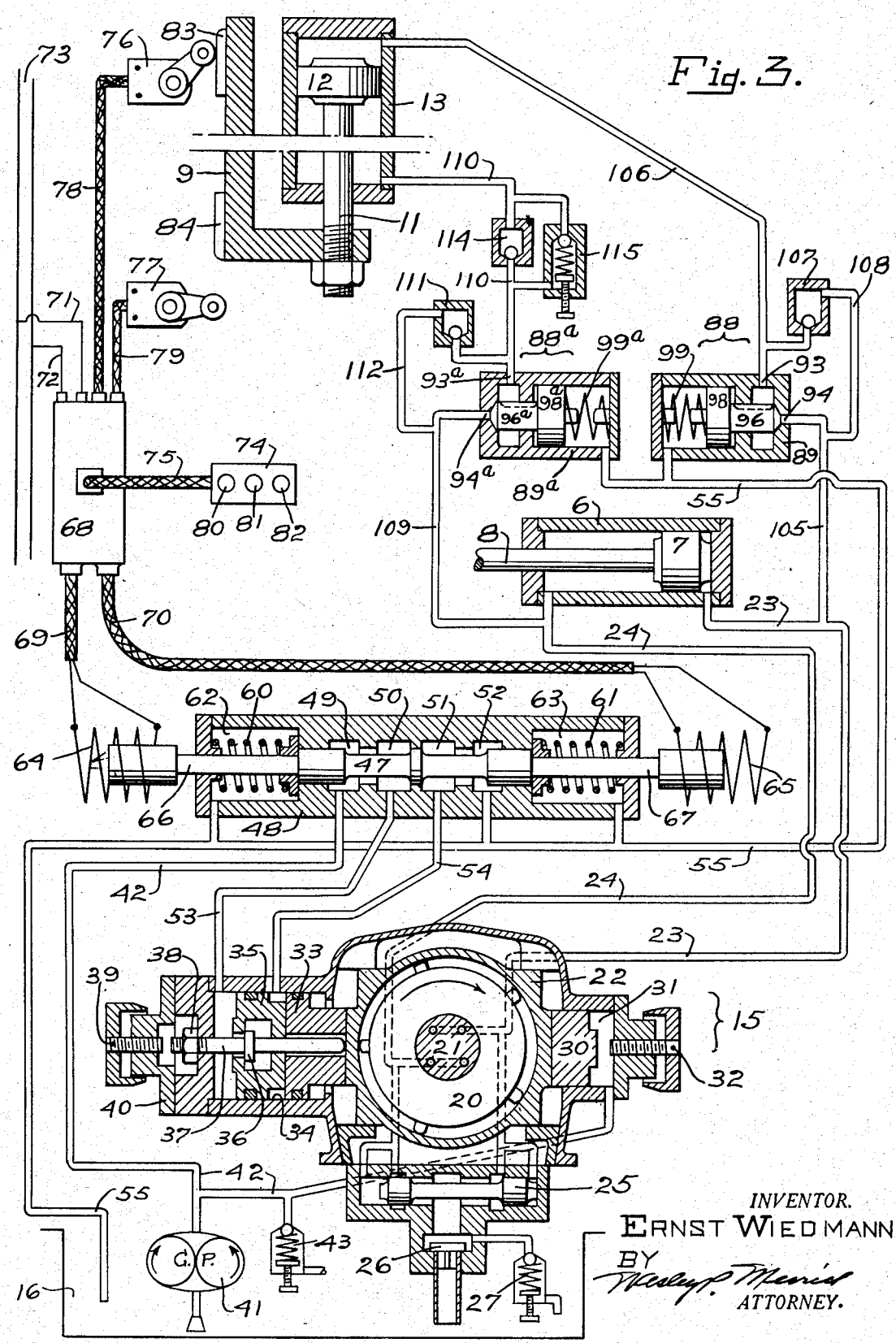

Patented Feb. 24, 1942

2,274,226

UNITED STATES PATENT OFFICE 2,274,226

BROACHING MACHINE

Ernst Wiedmann, Milwaukee, Wis., assignor to The Oilgear Company, Milwaukee, Wis., a corporation of Wisconsin Application June 10, 1938, Serial No. 212,883

5 Claims. (Cl. 90—33)

This invention relates to hydraulically operated machine tools of the type having two or more carriages or slides which must be operated in a predetermined sequence, such as a surface broaching machine in which a work slide and a tool slide must be reciprocated alternately in order that the work may be moved into position to be broached before the tool is advanced and moved out of the path of the tool before the tool is retracted.

The primary object of the present invention is to provide a machine of the above character in which sequential operation of two or more hydraulic motors is obtained without an appreciable loss of power and in which the first motor is able to exert a considerable force before the second motor is operated.

Other objects and advantages will appear from the description hereinafter given of a broaching machine in which the invention is embodied.

According to the invention in its principal aspect and as ordinarily embodied in practice, two slides of a machine are operated by two hydraulic motors which are connected to a pump in parallel with each other, the second of these motors is connected to the pump through a sequence valve which remains closed until after the first motor has exerted a force great enough to cause pump pressure to rise sufficiently to open the sequence valve, and then liquid passing through the sequence valve energizes a servomotor which opens the sequence valve wide enough to prevent it from throttling the flow of liquid to the second motor.

The invention is exemplified by the broaching machine shown somewhat schematically in the accompanying drawings in which the views are as follows:

Fig. 1 is in part a side view and in part a sectional elevation of the machine.

Fig. 2 is a sectional plan view taken on the line 2—2 of Fig. 1.

Fig. 3 is a diagram of the hydraulic circuit and shows the several parts in the positions occupied when the machine is idle.

Figs. 4 and 5 are sectional views showing the reversing valve with its valve element in positions different from that shown in Fig. 3.

Fig. 6 is a view showing one of the sequence valves open.

The machine chosen for illustration has its mechanism carried by a frame 1 which is arranged upon a base 2 and provided at its front with a knee 3.

The work to be operated upon is clamped in a fixture (not shown) fastened to a work carriage or slide 4 which is mounted upon horizontal guides or ways 5 carried by knee 3.

Slide 4 is adapted to be advanced and retracted along ways 5 by a hydraulic motor consisting of a cylinder 6, which is arranged beneath slide 4 and fastened to knee 3, and a piston 7 which is fitted in cylinder 6 and connected to slide 4 by a rod 8.

Motor 6—7 is adapted to move slide 4 toward and from the path of a broaching tool (not shown) carried by a tool carriage or slide 9 which is slidable vertically on ways 10 carried by the side members of frame 1.

Slide 10 has its lower end connected by a rod 11 to a piston 12 fitted in a cylinder 13 which is fastened to a cross member 14 of frame 1. Piston 12 and cylinder 13 constitute a hydraulic motor for reciprocating slide 10 to enable a broaching tool carried thereby to operate upon work carried by slide 4.

Liquid for operating motors 6—7 and 12—13 is supplied by a reversible pump 15 which is mounted upon a stationary reservoir 16 and driven by an electric motor 17.

While any suitable pump will suffice, pump 15 has been shown as being of the rolling piston type which is fully illustrated and described in Patent 2,074,068. It is deemed sufficient to state herein that pump 15 has its cylinders arranged radially in cylinder barrel 20 which is journaled upon a stationary valve shaft or pintle 21 having ports and passages formed therein through which liquid flows to and from the cylinders, that the outer ends of the pistons react against the annular inner surface of a reaction member carried by a thrust member or slide block 22, that no liquid will be discharged by pump 15 when slide block 22 is in its central or neutral position at which time its axis coincides with the axis of cylinder barrel 20, and that pump 15 will deliver liquid in a direction and at a rate dependent upon the direction and distance slide block 22 is shifted from its neutral position. As shown, pump 15 is adapted to deliver liquid into one and have liquid returned to it through the other of two channels 23 and 24 which are connected to pintle 21 in communication with the passages formed therein.

Since motors 6—7 and 12—13 are of the differential type so that, when operating, liquid is discharged therefrom at rates which are always either in excess of or less than the rate required to supply pump 15 with liquid, channels 23 and 24 are connected to reservoir 16 through a differential valve 25 which shifts automatically to connect the intake side of the pump to reservoir 16 in either direction of pump delivery as explained in Patent 1,558,002.

Valve 25 is connected to reservoir 16 through a check valve 26 and a resistance valve 27 which are connected in parallel with each other. Check valve 26 permits pump 15 to draw liquid freely from reservoir 16 but prevents liquid from being discharged into reservoir 16 except through resistance valve 26 which offers a low resistance to the flow of liquid therethrough to thereby cause the pump 15 to be supercharged.

When slide block 22 is shifted toward the right from its neutral position, pump 15 will discharge liquid into channel 24, liquid will be returned to it through channel 23, and valve 25 will be in the position shown so that liquid discharged from cylinders 6 and 13 in excess of the volume required to fill the pump cylinders may flow through the casing of valve 25 and through resistance valve 27 into reservoir 16.

When slide block 22 is shifted toward the left from its neutral position, pump 15 will discharge liquid into channel 23, liquid will be returned to it through channel 24, and valve 25 will be shifted by pump pressure to the other end of its casing so that pump 15 may draw liquid from reservoir 16 through check valve 26 and the casing of valve 25 to make up for the deficiency of liquid expelled from cylinders 6 and 13.

Slide block 22 is at all times urged toward the left by liquid acting upon a piston 30 which is connected to or in engagement with slide block 22 and is fitted in a stationary cylinder 31 carried by the casing of pump 15.

An adjusting screw 32 is threaded through the head of cylinder 31 to limit the movement of piston 30 and slide block 22 toward the right. Turning screw 32 will adjust the rate at which the pump 15 will discharge liquid into channel 24.

Slide block 22 is adapted to be moved toward the right by liquid acting upon a piston 33, which engages slide block 22 and is fitted in a stationary cylinder 34 carried by the pump casing, and by liquid acting upon a piston 35 which is fitted in cylinder 34 and adapted to engage the outer face of piston 33.

The movement of piston 35 toward the right is limited by a collar 36 fixed on a stop rod 37 which extends loosely through pistons 33 and 35 and through the head of cylinder 34. The inner end of rod 37 is adapted to engage slide block 22 and the outer end of rod 37 is provided with a nut 38 which is adjusted to so position collar 36 that piston 35 when energized will move slide block 22 exactly to its neutral position.

The outer end of rod 37 is adapted to engage an adjusting screw 39 which is threaded through a cap 40 fixed to the head of cylinder 34. Turning screw 39 adjusts the distance that rod 37 and slide block 22 may be moved toward the left and thereby determines the rate at which pump 15 will deliver liquid into channel 23.

Pistons 33 and 35 are larger than piston 30 so that slide block 22 will be moved toward the right when liquid is simultaneously supplied to both of cylinders 31 and 34 at the same pressure.

Liquid for operating pistons 33 and 35 is supplied by a gear pump 41 which is ordinarily driven in unison with pump 15 and arranged in the casing thereof according to the usual practice.

Gear pump 41 draws liquid from reservoir 16 and discharges it into a branched supply channel 42 at a rate in excess of requirements, the excess liquid being exhausted through a relief valve 43 which enables gear pump 41 to maintain in channel 42 a pressure equal to the resistance of relief valve 43.

Supply channel 42 has one of its branches connected to the outer end of cylinder 31 so that piston 30 is constantly urged toward the left by a constant force which is proportional to gear pump pressure.

The delivery of liquid from gear pump 41 to cylinder 34 is under the control of a reversing valve 47 which is fitted in a valve casing 48 and controls communication between four ports 49, 50, 51 and 52 formed in valve casing 48.

Port 49 has the other branch of supply pipe 42 connected thereto. Port 50 is connected by a channel 53 to cylinder 34 at or near the outer end thereof. Port 51 is connected by a channel 54 to cylinder 34 at a point between pistons 33 and 35. Port 52 is connected to a drain channel 55 which discharges into reservoir 16.

When valve 47 is in its central position as shown in Fig. 3, pressure extends from channel 42 through valve casing 48 and channel 53 to the left end of cylinder 34 and holds piston 35 against collar 36 on stop rod 37, and the space between pistons 33 and 35 communicates through channel 54 and valve casing 58 with drain channel 55 so that the pressure in cylinder 31 will cause piston 30 to hold slide block 22 against piston 33 and piston 33 against piston 35 in which position of slide block 22 pump 15 is at zero stroke and no liquid will be delivered thereby.

When valve 47 is shifted toward the right to the position shown in Fig. 4, port 49 is blocked and channels 53 and 54 are open to drain channel 55 so that liquid supplied by gear pump 41 to cylinder 31 can cause piston 30 to move slide block 22 toward the left until rod 37 abuts adjusting screw 39 at which time pump 15 will discharge liquid into channel 23 at a rate determined by the adjustment of screw 39.

When valve 47 is shifted toward the left to the position shown in Fig. 5, port 52 is blocked and channels 53 and 54 are open to port 49 so that liquid from gear pump 41 can flow through channel 42, valve casing 48 and channels 53 and 54 to cylinder 34 and cause pistons 33 and 35 to move slide block 22 toward the right until piston 30 abuts adjusting screw 32 at which time pump 15 will discharge liquid into channel 24 at a rate determined by the adjustment of screw 32.

Valve 47 is normally held in its central position by two springs 60 and 61 arranged, respectively, in two chambers 62 and 63 which are formed in opposite ends of valve casing 48 and connected to drain channel 55.

Valve 47 is adapted to be shifted in one direction or the other by one or the other of two solenoids 64 and 65 the cores of which are connected, respectively, to valve stems 66 and 67 which are fixed to opposite ends of valve 47 and extend outward through chambers 62 and 63.

Solenoids 64 and 65 may be controlled in any suitable manner. For the purpose of illustration, they have been shown as being connected to a control panel 68 by suitable conductors arranged in cables 69 and 70. Panel 68 may be arranged in any convenient position, connected by conductors 71 and 72 to a power line 73, connected to a switch box 74 by conductors arranged in a cable 75, and connected to two limit switches 76 and 77 by conductors arranged in cables 78 and 79.

Switch box 74 is ordinarily arranged upon or near the front of the machine and provided with three push button switches 80, 81 and 82. Limit switches 76 and 77 are so positioned that a cam 83 on slide 9 will operate switch 76 when slide 9 reaches the end of its up stroke and a cam 84 on slide 9 will operate switch 77 when slide 9 reaches the end of its down stroke.

The arrangement is such that, when push button 80 is pressed, solenoid 65 will be energized and shift valve 47 toward the right to the position shown in Fig. 4 so that slide block 22 will be moved to the left and cause pump 15 to discharge into channel 23, thereby causing slide 9 to descend as will presently appear.

When slide 9 reaches the end of its down stroke and operates limit switch 77 or when push button 81 is pressed, solenoid 64 will be energized and shift valve 47 toward the left to the position shown in Fig. 5 so that slide block 22 will be moved toward the right and cause pump 15 to discharge into channel 24, thereby causing slide 9 to be moved upward as will presently appear.

When slide 9 reaches the end of its up stroke and operates limit switch 76 or when push button 82 is pressed, both solenoids will be de-energized and springs 60 and 61 will move valve 47 to its central position as shown in Fig. 3 so that slide block 22 will be moved to its neutral position and pump 15 will cease to deliver liquid, thereby causing the machine to come to rest.

In order that motor 6—7 may move work slide 4 before motor 12—13 moves tool slide 9, channels 23 and 24 are connected directly to opposite ends of cylinder 6, a sequence valve 88 is connected between channel 23 and the upper end of cylinder 13, and a sequence valve 88ª is connected between channel 24 and the lower end of cylinder 13.

Each sequence valve consists of a casing having an inlet and an outlet, a valve member arranged in the casing with one end thereof normally covering the inlet and exposed at all times to the pressure in the inlet, a spring to hold the valve member against the inlet until the pressure therein becomes high enough to overcome the resistance of the spring, and a servo-motor which is controlled by the valve and functions to fully open the valve after the valve has been slightly opened by the pressure at the inlet. In practice, the valve and the servo-motor are combined into a single unit in order to simplify the construction thereof.

As best shown in Fig. 6, sequence valve unit 88 has its mechanism arranged within a casing 89 having formed therein an axial bore 90 and two counterbores 91 and 92 which are concentric with bore 90 and arranged at opposite ends thereof. Counterbore 91 has an outlet 93 formed in its side wall and an inlet 94 formed in its end wall in alinement with bore 90.

An annular valve seat 95 is formed around inlet 94 and normally engaged by one end of a valve member 96 which is fitted in bore 90 and has a small longitudinal groove 97 formed in its peripheral surface to provide communication between counterbores 91 and 92.

The other end of valve member 96 is fixed to a piston 98 which is fitted in counterbore 92 and forms therewith a servo-motor for holding valve member 96 away from valve seat 95 against the resistance of a spring 99 which continuously urges valve member 96 toward valve seat 95 and is arranged in counterbore 92 between piston 98 and the end wall of casing 89.

Since sequence valve unit 88ª is exactly the same as unit 88 except for such variations in the sizes or proportions of its parts as may be necessary or desirable to obtain efficient and economical operation of the machine, no description thereof will be given and corresponding parts of the two units have been indicated by corresponding reference numerals with the exponent "a" added to the numerals applied to unit 88ª.

In order that the movement of pistons 98 and 98ª may not be hampered by entrapped liquid or gas, the head ends of counterbores 92 and 92ª are connected to drain channel 55.

Sequence valve 88 has its inlet 94 connected to channel 23 by a channel 105 and its outlet 93 connected to the upper end of cylinder 13 by a channel 106 so that liquid cannot flow from channel 23 to cylinder 13 except through valve 88. In order that liquid may be returned from the upper end of cylinder 13 to pump 15 when piston 12 is moved upward, a check valve 107 has its inlet connected to channel 106 and its outlet connected by a channel 108 to channel 105.

Sequence valve 88ª has its inlet 94ª connected to channel 24 by a channel 109 and its outlet 93ª connected to the lower end of cylinder 13 by a channel 110 so that liquid cannot flow from channel 24 to cylinder 13 except through valve 88ª. In order that liquid may be returned from the lower end of cylinder 13 to pump 15 when piston 12 is moved downward, a check valve 111 has its inlet connected to channel 110 and its outlet connected by a channel 112 to channel 109.

In order to prevent slide 9 from descending when the machine is idle, a check valve 114 is arranged in channel 110 and has an oppositely opening resistance valve 115 connected in parallel therewith. Check valve 114 permits liquid to flow freely from valve 88ª to the lower end of cylinder 13 but prevents liquid from escaping from the lower end of cylinder 13 except through resistance valve 115 which opens at a low pressure but offers sufficient resistance to the flow of liquid therethrough to prevent slide 9 from descending when the machine is idle.

*Operation*

Assuming that pumps 15 and 41 are running, that the parts are in the positions indicated in Fig. 3, that a piece of work has been fastened to slide 4 and that a surface broaching tool is fastened to slide 9, the machine will operate as follows:

When push button 80 is pressed, solenoid 65 will be energized and shift valve 47 to the position shown in Fig. 4 in which position cylinder 34 is open to drain channel 55 so that the gear pump liquid can cause piston 30 to shift slide block 22 toward the left, thereby causing pump 15 to discharge into channel 23.

Sequence valve 88 will initially prevent liquid from flowing to the upper end of cylinder 13. Therefore, the entire volume of liquid discharged by pump 15 will flow through channel 23 to the head end of cylinder 6 and cause piston 7 to move slide 4 toward the left until it stalls against a stop (not shown) at which time the work on slide 4 is in position to be broached by the tool on slide 9.

The liquid expelled from cylinder 6 by piston 7 will flow through channel 24 to pump 15 which will draw enough liquid from reservoir 16 through valves 25 and 26 to make up for the displacement of rod 8.

The stalling of slide 4 causes pump pressure to rise until it is exerting sufficient force upon the end of the valve member 96 of sequence valve unit 88 to force it away from valve seat 95 against the resistance of spring 99.

Valve member 96 will at first throttle the flow of liquid from channel 105 to channel 106 and thereby enable motor 6—7 to hold work slide 4 firmly in position but, if no means were provided for fully opening sequence valve 88 after the tool engaged the work, valve member 96 would continue to throttle the flow and thereby cause power to be wasted and the motive liquid to become heated.

However, as soon as the tool engages the work, pressure will rise in counterbore 91 and then liquid will flow through groove 97 and cause piston 98 to fully retract valve member 96, thereby preventing any loss of power or heating of the motive liquid due to throttling.

The liquid from pump 15 will then flow freely to the upper end of cylinder 13 and cause piston 12 to move slide 9 downward, thereby causing the tool carried by slide 9 to operate upon the work carried by slide 4.

The liquid ejected by piston 12 from the lower end of cylinder 13 flows through the upper section of channel 110, resistance valve 115, the lower section of channel 110, check valve 111 and channels 112, 109 and 24 to pump 15 which draws enough liquid from reservoir 16 through valves 25 and 26 to make up for the displacement of rod 11.

When slide 9 reaches the end of its down stroke, cam 84 will operate limit switch 77 which deenergizes solenoid 65 and energizes solenoid 64. Solenoid 64 will shift valve 47 to the position shown in Fig. 5 so that gear pump liquid can cause piston 33 to shift slide block 22 toward the right, thereby causing pump 15 to discharge into channel 24.

Sequence valve 88ª will initially prevent liquid from flowing to the lower end of cylinder 13. Therefore, the entire volume of liquid discharged by pump 15 will flow through channel 24 to the rod end of cylinder 6 and cause piston 7 to move slide 4 toward the right until piston 7 stalls against the end of cylinder 6 at which time the work on slide 4 is out of the path of the tool.

The liquid expelled from cylinder 6 by piston 7 will flow through channel 23 to pump 15. A part of this liquid will flow through the passages in pintle 21 and fill the pump cylinders, and the remainder of this liquid will be exhausted through valves 25 and 27 into reservoir 16.

The stalling of piston 7 causes pump pressure to rise until it is exerting sufficient force upon the end of valve member 96ª to force it away from its valve seat against the resistance of spring 99ª.

Due to the weight of slide 9, pressure rises in channel 110 and counterbore 91 and liquid will flow through groove 97ª and cause piston 98ª to fully retract valve member 96ª so that it cannot throttle the flow of liquid from channel 109 to channel 110. Liquid from pump 15 will then flow freely to the lower end of cylinder 13 and cause piston 12 to move slide 9 upward.

The liquid ejected by piston 12 from the upper end of cylinder 13 flows through channel 106, check valve 107, and channels 108, 105 and 23 to pump 15. A part of this liquid will flow through the passages in pintle 21 and fill the pump cylinders, and the remainder of this liquid will be exhausted through valves 25 and 27 into reservoir 16.

When slide 9 reaches the end of its up stroke, cam 83 will operate limit switch 76 which will deenergize solenoid 64 and then spring 60 will shift valve 47 to its neutral position, thereby causing pump displacement to be reduced to zero and the machine brought to rest.

The invention herein set forth is susceptible of various modifications without departing from the scope thereof as hereafter claimed.

The invention is hereby claimed as follows:

1. In a machine having two reciprocable carriages, the combination of a pump, two hydraulic motors mechanically connected to said carriages to operate the same and hydraulically connected to said pump in parallel with each other, means for controlling the delivery of liquid from said pump to said motors to thereby control the operation of said motors, means for causing said motors to operate in sequence including a normally closed pressure responsive valve connected between said pump and the second of said motors for preventing liquid from flowing from said pump to the second of said motors until the first of said motors has been operated by said liquid and is exerting sufficient force to cause the pressure of said liquid to reach a value great enough to open said valve and means operated by liquid passed through said valve for causing said valve to open wide enough to prevent any drop in pressure thereacross.

2. In a machine having two reciprocable carriages, the combination of a first reciprocating hydraulic motor connected to the first of said carriages for reciprocating the same, a pump, means including fluid channels connecting said pump to opposite ends of said motor and forming therewith a hydraulic circuit, a second reciprocating hydraulic motor connected to the second of said carriages for reciprocating the same, means connecting one end of said second motor to one side of said circuit, means connecting the other end of said second motor to the other side of said circuit including a normally closed pressure responsive valve for preventing liquid from flowing to said second motor until said first motor has been operated and is exerting sufficient force to cause the pressure of said liquid to reach a value great enough to open said valve, and means operable by fluid passed through said valve for fully opening said valve to thereby prevent said valve from throttling the flow of liquid to said second motor.

3. In a machine having two reciprocable carriages, the combination of a first reciprocating hydraulic motor connected to the first of said carriages for reciprocating the same, a pump, means including fluid channels connecting said pump to opposite ends of said motor and forming therewith a hydraulic circuit, means for reversing the flow in said circuit, a second reciprocating hydraulic motor connected to the second of said carriages for reciprocating the same, means connecting opposite ends of said second motor to opposite sides of said circuit including a normally closed sequence valve connected between each end of said second motor and said circuit for preventing liquid from flowing from said circuit to said second motor until said first motor has been operated, said valve being adapted to open in response to the pressure in said first motor reaching a predetermined value, a servo-motor connected to each of said valves to fully open it after it has been partly opened by pressure, each of said servo-motors being energized solely by liquid passing through the valve to which it is connected, and a check valve connected in parallel with each of said sequence valves to permit liquid to flow freely from said second motor to said circuit.

4. In a machine having two reciprocable carriages, the combination of a first reciprocating hydraulic motor connected to the first of said carriages for reciprocating the same, a pump, means including fluid channels connecting said pump to opposite ends of said motor and forming therewith a hydraulic circuit, a second reciprocating hydraulic motor connected to the second of said carriages for reciprocating the same, means connecting opposite ends of said second motor to opposite sides of said circuit including a normally closed sequence valve connected between each end of said second motor and said circuit for preventing liquid from flowing from said circuit to said second motor until said first motor has been operated, said valve being adapted to open in response to the pressure in said first motor reaching a predetermined value, a servo-motor connected to each of said valves to fully open it after it has been partly opened by pressure, each of said servo-motors being energized solely by liquid passing through the valve to which it is connected, a check valve connected in parallel with each of said sequence valves to permit liquid to flow freely from said second motor to said circuit, means for directing liquid from said pump into one side of said circuit to thereby cause said motors to advance said carriages in succession, means responsive to the second of said carriages reaching the end of its advance stroke for directing liquid from said pump into the other side of said circuit to thereby cause said motors to retract said carriages in succession, and means responsive to the second of said carriages reaching the end of its retraction stroke for interrupting the delivery of liquid from said pump to said circuit.

5. In a machine having two reciprocable carriages, the combination of two hydraulic motors mechanically connected to said carriages to reciprocate the same, a pump for supplying liquid to said motors to energize the same, means including fluid channels for connecting the first of said motors in series with said pump and forming therewith a hydraulic circuit, means for reversing the flow of liquid in said circuit, means for connecting the second of said motors to opposite sides of said circuit in parallel with said first motor including a normally closed pressure responsive valve connected between each side of said circuit and said second motor for preventing liquid from flowing from said circuit to said second motor until the first of said motors has been operated and is exerting sufficient force to cause pump pressure to rise to a value great enough to open said valve and thereby permit liquid to flow to said second motor to operate the same, and a servo-motor operated by liquid passed through said valve for fully opening said valve to prevent it from throttling the flow of liquid therethrough.

ERNST WIEDMANN.